United States Patent [19]
Mertins et al.

[11] Patent Number: 5,650,609
[45] Date of Patent: Jul. 22, 1997

[54] SEED MONITORING SYSTEM FOR COUNTING SEEDS AS THEY ARE DISPENSED THROUGH A SEED PLANTING TUBE

[75] Inventors: Karl-Heinz O. Mertins, Fargo; Barry D. Batcheller, West Fargo; Douglas L. Hauck, Fargo, all of N. Dak.

[73] Assignee: Phoenix International Corporation, Fargo, N.C.

[21] Appl. No.: 441,247

[22] Filed: May 15, 1995

[51] Int. Cl.$^6$ ............................................. G01V 8/00
[52] U.S. Cl. ........................... 250/222.2; 250/222.1; 377/6
[58] Field of Search ................. 250/222.2, 223 R, 250/227.11, 227.21, 573, 574, 226, 229, 222.1, 206, 239; 377/6–9, 28–29, 53; 221/3, 185, 211, 254, 71, 233, 2, 9, 25

[56] References Cited

U.S. PATENT DOCUMENTS

| | | |
|---|---|---|
| Re. 30,539 | 3/1981 | van der Lely . |
| 2,803,756 | 8/1957 | Cox . |
| 3,120,125 | 2/1964 | Vasel .................. 250/903 |
| 3,370,285 | 2/1968 | Cruse et al. . |
| 3,422,776 | 1/1969 | Gregory, Jr. . |
| 3,469,157 | 9/1969 | Rhodes . |
| 3,511,411 | 5/1970 | Weiss . |
| 3,527,928 | 9/1970 | Ryder et al. . |
| 3,537,091 | 10/1970 | Schenkenberg . |
| 3,648,054 | 3/1972 | Nance . |
| 3,723,989 | 3/1973 | Fathauer et al. . |
| 3,828,173 | 8/1974 | Knepler . |
| 3,855,953 | 12/1974 | Fathauer et al. . |
| 3,881,631 | 5/1975 | Loesch et al. . |
| 3,890,221 | 6/1975 | Muehlethaler . |
| 3,974,377 | 8/1976 | Steffen . |
| 3,989,311 | 11/1976 | De brey . |
| 4,023,507 | 5/1977 | van der Lely . |
| 4,042,114 | 8/1977 | Arild et al. . |
| 4,054,779 | 10/1977 | Wilke . |
| 4,096,424 | 6/1978 | Hysler . |
| 4,109,824 | 8/1978 | Davis . |
| 4,145,980 | 3/1979 | Boots . |
| 4,150,286 | 4/1979 | Toll et al. . |
| 4,163,507 | 8/1979 | Bell . |
| 4,166,948 | 9/1979 | Steffen . |

(List continued on next page.)

OTHER PUBLICATIONS

Reid, W. S. "Seed Counters Air Research," Can. Agric., 19(1) pp. 24–27, (Jan. 1974).

Carlow, C. A. et al. "An Electronic Seed Counter and Group Number Discriminator," Journal of Agricultural Engineering Research, vol. 6, No. 2, pp. 130–136 (Jan. 1961).

Dudley, J. W. et al. "Inheritance of Branched Inflorescence and Vestigial Flower in Alfafa, Medicago sativa, L., " Agronomy Journal, 48:2, pp. 91–92 (Jan. 1956).

Reid, W. S. et al. "A Photoelectric Seed Counting Detector," J. agric. Engng. Res. 21, pp. 213 215 (Jan. 1976).

Reid, W. S. et al. "A Laser Light Source Seed Counter," J. agric. Engng. Res. 19, pp.265–269 (Jan. 1974).

*Primary Examiner*—Que Le
*Attorney, Agent, or Firm*—Harness, Dickey & Pierce, P.L.C.

[57] ABSTRACT

An optical seed counting system for counting seeds that are dispensed through a plurality of seed tubes associated with a multiple row seed planter. Each seed tube includes an optical sensor having an emitter and a receiver. The emitter and the receiver each include lens components for shaping an optical beam. Optical fibers connect the emitter to an optical beam generating device and the receiver to an optical beam detecting device both positioned remotely from the seed tubes. The optical components of the emitter generate a substantially spatially uniform optical beam across a sensing area within the seed tubes. The detecting device generates a pulse signal where the period of the pulses represents the intensity of the optical beam in the sensing area. Seeds that are dispensed in the seed tubes interfere with the optical beam in a manner that affects the light intensity of the beam. Therefore, the change in intensity of the beam indicates the number of seeds.

34 Claims, 11 Drawing Sheets

U.S. PATENT DOCUMENTS

| | | |
|---|---|---|
| 4,185,224 | 1/1980 | Thompson . |
| 4,238,790 | 12/1980 | Balogh et al. . |
| 4,246,469 | 1/1981 | Merlo . |
| 4,307,390 | 12/1981 | Steffen et al. . |
| 4,413,685 | 11/1983 | Gremelspacher . |
| 4,432,675 | 2/1984 | Machnee . |
| 4,534,651 | 8/1985 | Minikane ............................ 250/227.11 |
| 4,555,624 | 11/1985 | Steffen . |
| 4,634,855 | 1/1987 | Friend et al. . |
| 4,646,941 | 3/1987 | Grosse-Scharmann et al. . |
| 4,710,757 | 12/1987 | Hasse . |
| 4,834,004 | 5/1989 | Butuk et al. . |
| 4,892,157 | 1/1990 | Gemar . |
| 4,994,666 | 2/1991 | Higgison et al. .................... 250/222.2 |
| 5,090,791 | 2/1992 | Kidder et al. ...................... 250/227.11 |
| 5,170,730 | 12/1992 | Swallow . |
| 5,301,848 | 4/1994 | Conrad et al. . |

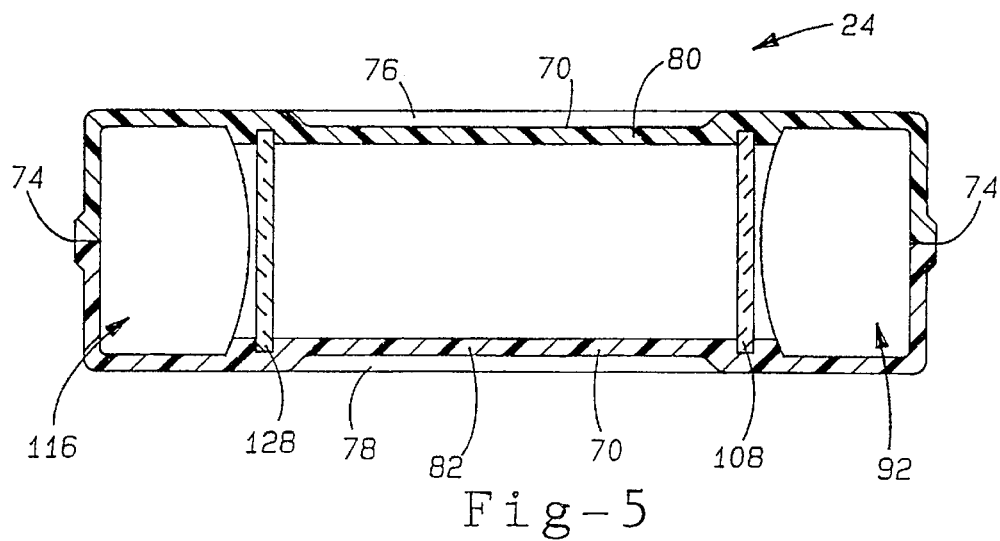
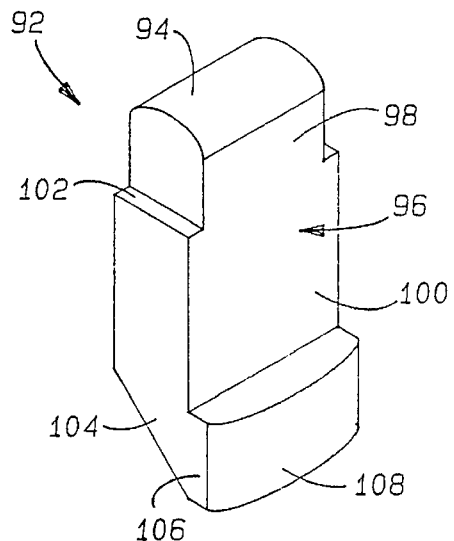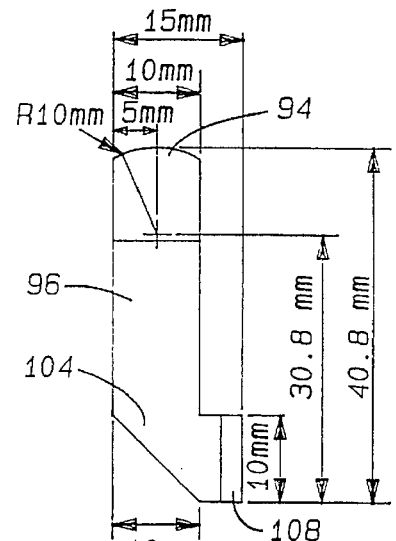
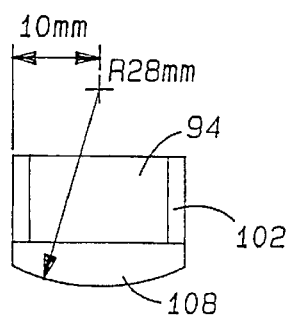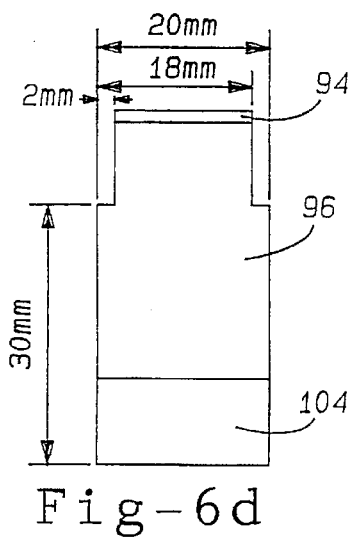

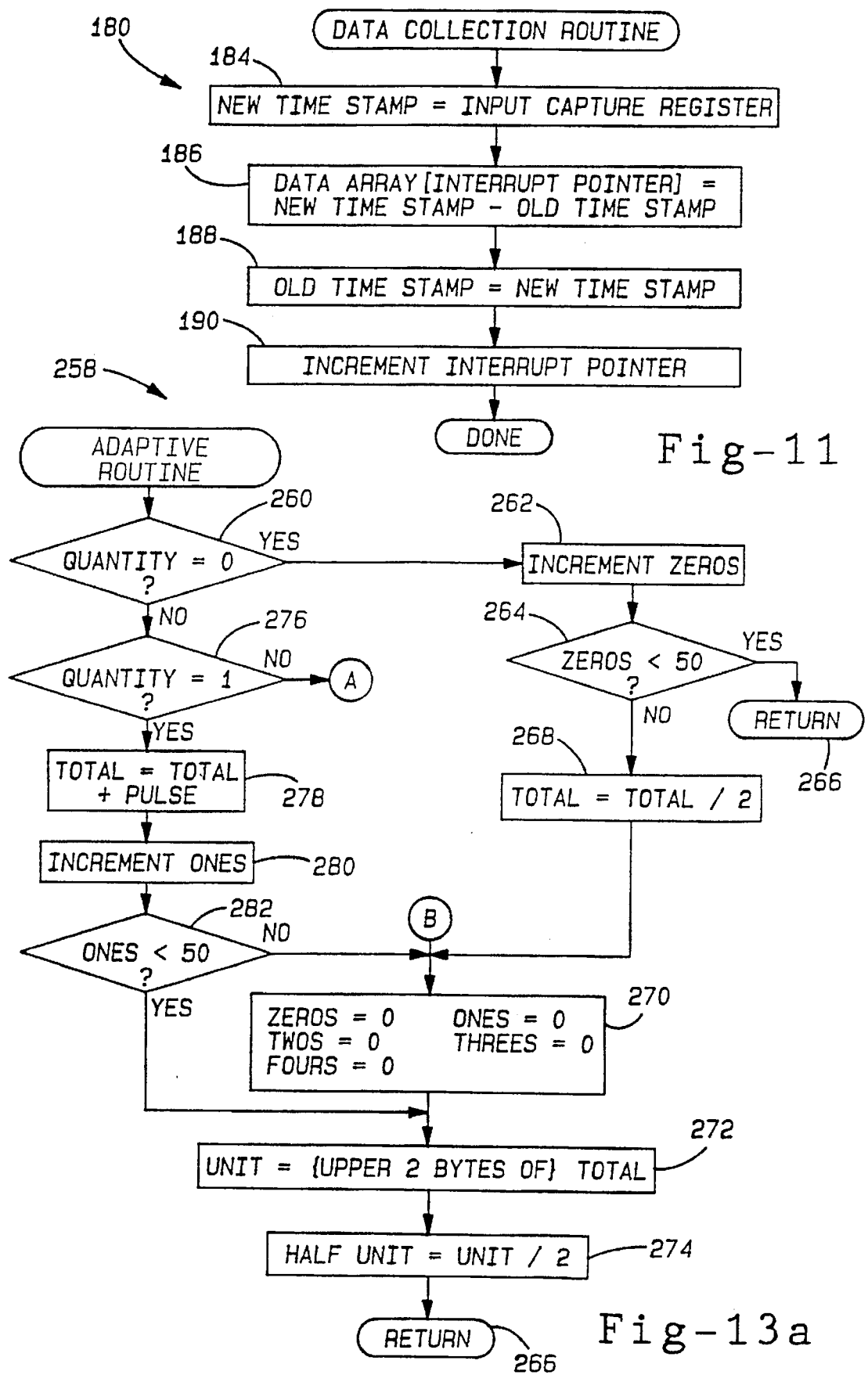

SEED MONITORING SYSTEM FOR COUNTING SEEDS AS THEY ARE DISPENSED THROUGH A SEED PLANTING TUBE

BACKGROUND OF THE INVENTION

1. Field of the Invention

This invention relates generally to a discrete particle counter and, more particularly, to a seed monitor for counting seeds dispensed by a seed planter through a plurality of seed tubes, where the seed monitor includes an optical sensor attached to each seed tube and one or more electro-optical controllers remotely connected to a group of sensors by optical fibers.

2. Discussion of the Related Art

As is well understood, it is important to monitor the quantity of seeds that are being planted into a planting row, especially in a high capacity agricultural environment such as a farm where the seeds are corn seeds, soy bean seeds and the like. Planting too many seeds causes the resulting plant product to be too closely spaced together to allow for proper plant growth, thus affecting the crop yield. Planting too few seeds reduces the effective use of the planting area. For high output planting, industrial seed planters have been devised to plant a high volume of seeds relatively quickly. To ensure that the proper number of seeds are planted by the seed planters, a seed monitoring system is generally provided that counts the seeds as they are dispensed through seed tubes associated with the planter. A typical seed planter will have many seed tubes for planting a multitude of planting rows simultaneously.

One type of seed monitoring system incorporates optical devices that generate an optical beam directed across the seed tubes, and optical sensors that are sensitive to the loss of light intensity caused by seeds interfering with the optical beam. An electrical counting circuit monitors the occurrences of loss of light intensity to provide a count of the seeds. Various optical seed monitoring systems of this type are disclosed in U.S. Pat. Nos. 3,974,377 issued to Steffen; 4,555,624 issued to Steffen et al.; and 4,163,507 issued to Bell.

These, as well as other, optical seed monitoring systems have been inaccurate for various reasons. One inaccuracy results from the spatial nonuniformity of the optical beam that senses the seeds. Because of spatial nonuniformity, the intensity of optical rays generated by the optical devices vary depending upon the location within the optical beam. Therefore, the ability of the optical sensor to detect the interruption of the optical beam by the seeds varies depending on the location of the seeds within the beam. Consequently, the optical sensor may not adequately detect seeds being dropped through certain locations in the seed chute.

One prior art seed monitoring system has attempted to address spatial nonuniformity of the optical beam of a seed sensor by proposing an optical device that generates a trapezoidal cross-section of an optical beam. However, the trapezoidal cross-section creates an undesirable spatial restriction for groups of seeds as they are dropped through the seed tube. U.S. Pat. No. 4,634,855 issued to Friend et al. also discloses an attempt to create an optical beam of high uniformity. However, this proposed solution is of such complexity that the feasibility for commercial success is limited.

Another drawback of the known optical seed monitoring systems is attributable to the environment in which the optical sensors are operating. Because the seed planters encounter dirt, dust and various chemicals during the planting process that may accumulate in the seed tubes, the sensors may be adversely affected because of contamination of the optical components. This situation is further exasperated in those types of optical sensors in which the optoelectronic components and/or electronic circuits of the sensor are located at or attached to the seed tubes. Other problems arrive by attempting to protect the circuits and associated wire harness connectors from the corrosive effects due to a combination of moisture and the environmental elements.

Another drawback of the known optical seed monitoring systems occurs when the seed sensors are associated with circuitry that counts pulses when the optical beam is interrupted by the seeds. This may result in a count inaccuracy because a plurality of seeds may simultaneously traverse the optical beam and be counted as a single seed. A related problem is that the accuracy of the known optical seed monitoring systems tend to deteriorate with increasing planting speed, with higher seed populations per acre, and with small grains and seeds. These optical systems may be incapable of sufficiently rapid response to reliably count each seed.

What is needed is an optical seed monitoring system that effectively counts each individual seed at a high planting rate, and does not suffer from the drawbacks discussed above. It is therefore an object of the present invention to provide such an optical seed counter.

SUMMARY OF THE INVENTION

In accordance with the teachings of the present invention, a particle counting system including fiber-optic sensors is disclosed. The particle counting system has a particular use for counting seeds as they are dispensed by a plurality of seed tubes associated with a seed planter. Each seed tube includes an optical sensor having an emitter and a receiver. The emitter includes an emitter lens body having at least one cylindrical lens and folding optics. The receiver also includes a receiver lens body having at least one cylindrical lens and folding optics.

The emitter is remotely connected to a beam generating device by an emitter optical fiber and the receiver is remotely connected to a detecting device by a receiver optical fiber. An optical beam generated by the beam generating device that is emitted into the emitter lens body first impinges an aperture that affects the spatial uniformity of the optical beam. The emitter lens body emits a substantially collimated and spatially uniform optical beam across a sensing area within the seed tube. Seeds that are dispensed through the seed tube interfere with the optical beam and affect its intensity. The optical beam is then received by the receiver lens body that focuses the optical beam onto one end of the receiver optical fiber. A photodetector and associated circuitry receives the optical beam from the receiver lens body through the receiver optical fiber, and generates a square wave pulse signal where the period of the pulses is representative of the intensity of the optical beam.

A monitoring system is responsive to the pulse signal to determine the period of the signal and generate a signal indicative of the number of seeds traversing the sensing area from this period. The monitoring system includes a sensitivity adjustment feature that compensates for varying base line levels of optical beam intensity. Further, the monitoring system adapts to different particles having different sizes and shapes. Also, the monitoring system is capable of counting a plurality of particles that traverse the sensing ares simultaneously or in a partially overlapping fashion.

3

Additional objects, advantages and features of the present invention will become apparent from the following description and appended claims, taken in conjunction with the accompanying drawings.

BRIEF DESCRIPTION OF THE DRAWINGS

FIG. 5 is a horizontal sectional view taken along line 5—5 of FIG. 4;

FIG. 6(a) is a perspective view of an emitter lens body used in connection with an emitter side of the seed monitoring system of the present invention;

FIG. 6(b) shows a side view of the emitter lens body of FIG. 6(a);

FIG. 6(c) shows a top view of the emitter lens body of FIG. 6(a);

FIG. 6(d) shows a front view of the emitter lens body of FIG. 6(a);

FIG. 11 is a flow chart diagram of a data collection routine of the seed monitor system according to the invention;

4

DETAILED DESCRIPTION OF THE PREFERRED EMBODIMENTS

The following description of the preferred embodiments concerning an optical seed planter monitoring system is merely exemplary in nature, and is in no way intended to limit the invention or its applications or uses.

Figure 1:
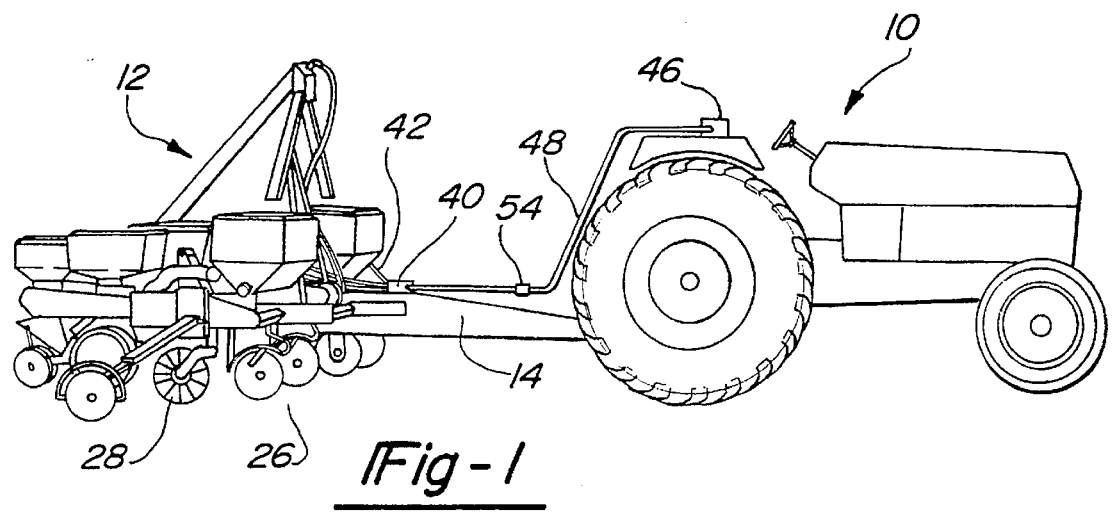
FIG. 1 is a side view of a tractor towing a seed planter including a seed monitoring system according to an embodiment of the present invention.

FIG. 1 shows a side view of a tractor 10 intended to represent various types of farm tractors that perform various tasks in a high volume agricultural environment as would be present on a farm. In the depiction of FIG. 1, the tractor 10 is towing a multiple row seed planter 12 by a tow bar 14. The seed planter 12 creates multiple parallel furrows in the soil of a field area (not shown) to be planted, dispenses a controlled quantity of spaced apart seeds into the furrows, and then covers the furrows in a manner that allows the seeds to germinate and become plants. The seed planter 12 is intended to represent various known types of seed planters that are capable of planting many rows of seeds simultaneously. Known seed planters of the type of the seed planter 12 can simultaneously plant more than twenty four parallel configured rows of crops. As will be appreciated by those skilled in the art, the seed planter 12 can further represent many other types of seed planters including those that can be mounted to a rear or front hitch of the tractor 10 in either a 3-point or semi-mounted (2-point) configuration, as well as certain types of air seeding systems.

Figure 2:
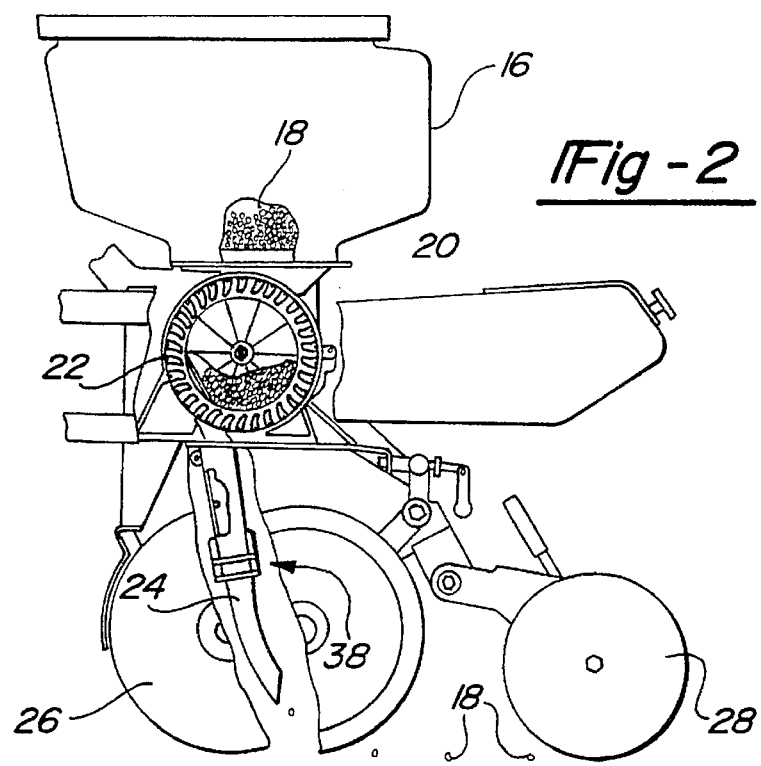
FIG. 2 is a cut-away sectional view of the seed planter of FIG. 1 showing a seed tube dispensing seed.

FIG. 2 shows a cut-away side view of a portion of the seed planter 12. The seed planter 12 includes a hopper 16 that stores a quantity of seeds 18 to be planted. The seeds 18 are loaded into a rotary mechanism 20 from the hopper 16. The rotary mechanism 20 includes a series of equally spaced cavities 22 circumferentially positioned around the mechanism 20 so as to selectively dispense the seeds 18 into a seed tube 24. An assembly of disc openers 26 rotate as the seed planter 12 is towed by the tractor 10 to create the furrows in the plant area. As the seeds 18 are dispensed into the furrows, a closing wheel assembly 28 covers the furrows with dirt. The rotation of the mechanism 20 is geared to the rotation of ground drive wheel assemblies (not shown) such that the seeds 18 are dispensed into the furrows at a rate that depends on the towed rate of the seed planter 12.

Figure 3:
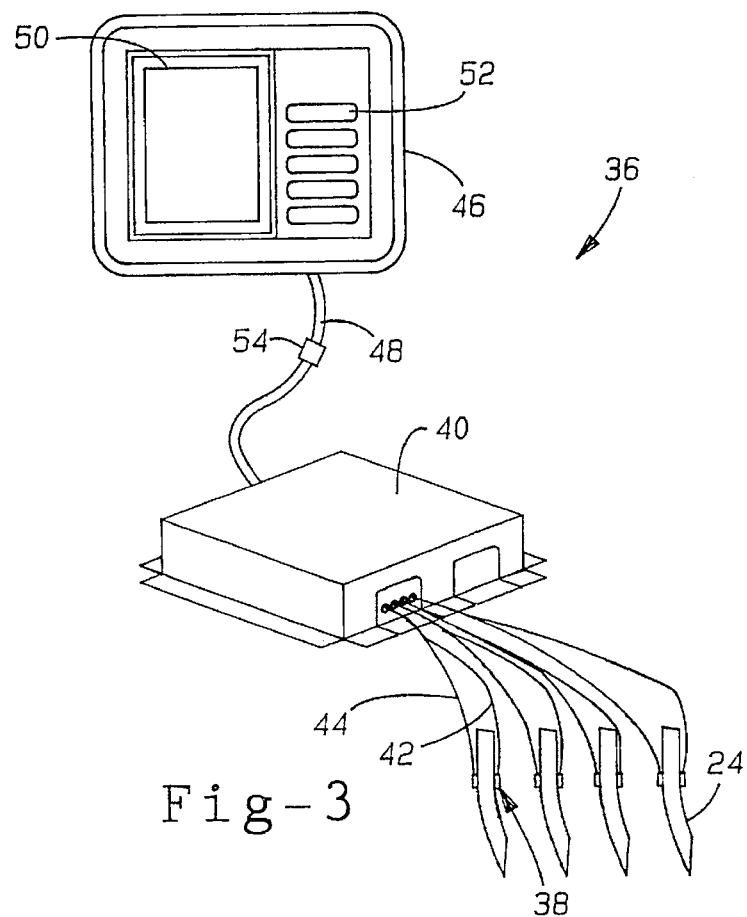
FIG. 3 is a general overview depicting the seed monitoring system of the present invention separated from the tractor and seed planter of FIG. 1.

A seed monitoring system 36, according to an embodiment of the present invention, is used in association with the seed planter 12 to count the seeds 18 that are dispensed into the seed tubes 24 so as to ensure that the proper number of seeds 18 are being planted to avoid under planting and over planting. The seed monitoring system 36 is shown separated from the tractor 10 and the seed planter 12 in FIG. 3. Four seed tubes 24 are shown in the depiction in FIG. 3, however, it will be appreciated by those skilled in the art that the number of seed tubes 24 can vary depending on the particular seed planter 12 being used. As will be discussed in greater detail below, the seed monitoring system 36 includes a sensor 38 that emits an optical beam across the seed tube 24 so that as the seeds 18 are dropped through the seed tube 24, they interfere with the optical beam to cause a change in optical intensity of the beam that is indicative of the size and quantity of the seeds 18. A signal processing unit (SPU) 40 is positioned remote from the seed tubes 24 and the sensors 38.

A transmitting optical fiber 42 and a detecting optical fiber 44 are connected to the SPU 40 and to the sensors 38. In one embodiment, the optical fibers 42 and 44 are plastic, single cable, multimode optical fibers. Plastic optical fibers have been selected over glass optical fibers because of a number of advantages. These advantages include high flexibility, easy cutting and termination, and low cost. Single cable optical fibers have been selected over optical fiber bundles for simplicity and low cost reasons. A typical optical fiber of the type described herein will include a core region, a cladding region surrounding the core region and an outer jacket material. The cladding region has a slightly lower index of refraction than the core region such that light rays that are emitted into the core region at or below a maximum angle will be substantially reflected at the core/cladding barrier so as to propagate down the fiber. In one specific embodiment, the plastic material of the core and cladding region is polymethylmethacrylate (PMMA) and the outer jacket material is a black polyethylene. Optical fibers of this type are available from AMP Incorporated, Harrisburg, Pa. as part nos. 501232-5 and 501336-1. However, as would be appreciated by one skilled in the art, different plastics could also be used for the optical fiber, as well as glass fibers without departing from the scope of the invention.

An operator terminal 46 receives signals from the SPU 40 over a cable 48. The operator terminal. 46 includes a display screen 50 and a series of control switches 52. The operator terminal 50 offers a flexibility in the system 36 that can be tailored to accommodate a variety of different applications. Particularly, the display screen 50 can be a custom liquid crystal display (LCD) and the switches 52 can be hard-key switches for manual operator inputs. Also, the screen 50 can be a dot-matrix LCD and the switches 52 can be separated into hard-key switches and soft-key switches. Further, the switches 52 can be incorporated onto a touch screen 50 having a touch screen feature. Additionally, the terminal 46 can be a virtual terminal that is linked to a common data bus, such as CAN or SAE J1850B, where the virtual terminal gets its functional content and display content individually defined by external signal processing units, an example of which is SPU 40. In this manner, the operator terminal 46 can be a terminal that is dedicated to only the data of the seed monitoring system 36, or can be a terminal accommodating various degrees of flexibility to be used with other types of implements towed by or mounted to the tractor 10, such as sprayers, balers and harvesters.

In one embodiment, the SPU 40 is mounted at a suitable location on the seed planter 12 remotely from the sensors 38 and the seed tubes 24. The operator terminal 46 is mounted at a suitable location on the tractor 10. A connector 54 is provided to disconnect the SPU 40 from the operator terminal 46 when the seed planter 12 is disconnected from the tractor 10. The cable 48 between the SPU 40 and the operator terminal 46 can be an electrical cable or a fiber-optic cable. For those areas on the seed planter 12 in which the optical fibers 42 and 44 are exposed, and the optical cable connection between the SPU 40 and the operator terminal 46, it may be desirable to run the optical fibers 42 and 44 and the cable 48 through appropriate conduit or selected reinforced cables. Such cables are available from Poly-Optical Products, Inc., Irvine, Calif.

As will be discussed in detail below, the SPU 40 generates an optical beam that is emitted down the fiber 42 to traverse the seed tube 24. The optical beam is then collected by the fiber 44 and returned to the SPU 40 where it is converted to a square wave pulse signal indicative of the optical intensity of the beam within the seed tube 24. The seeds 18 that are dropped through the tube 24 interfere with the optical beam as it traverses the tube 24. Signal processing algorithms associated with the SPU 40 allow the system 36 to monitor and count particles and seeds of different shapes and sizes. Further, the system 36 can count several seeds or particles that pass simultaneously or partially simultaneously through the seed tubes 24. The electrical signals generated by the SPU 40 are transmitted to the operator terminal 46 where they are displayed on the screen 50. The control switches 52 allow an operator to display various outputs generated by the SPU 40 that give a physical representation of the quantity of seeds 18 being dispensed and the uniformity of the dispensing process in each of the seed tubes 24.

Figure 4:
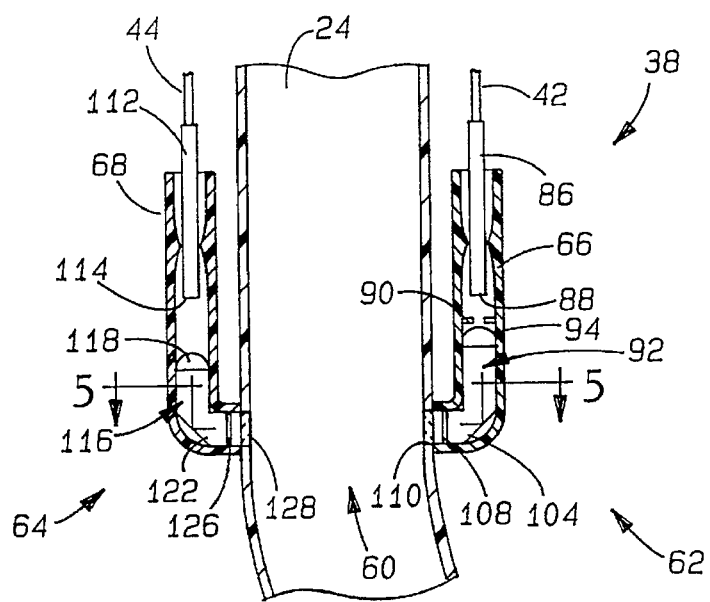
FIG. 4 is a cut-away vertical sectional view of a portion of the seed tube shown in FIG. 2 around a seed sensing area within the tube.
Figure 7A:
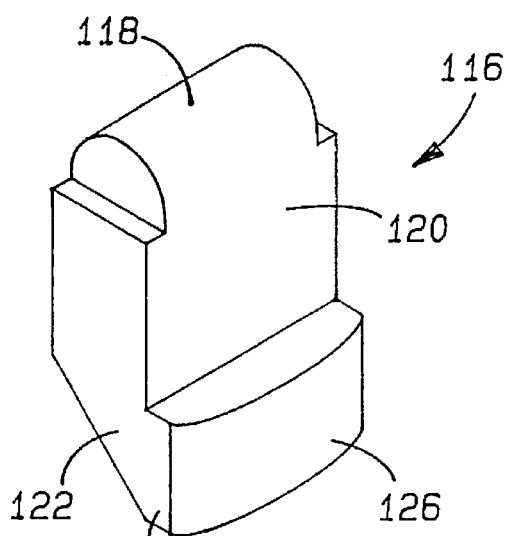
FIG. 7(a) shows a perspective view of a receiver lens body used in connection with a receiver side of the seed monitoring system of the present invention.
Figure 7B:
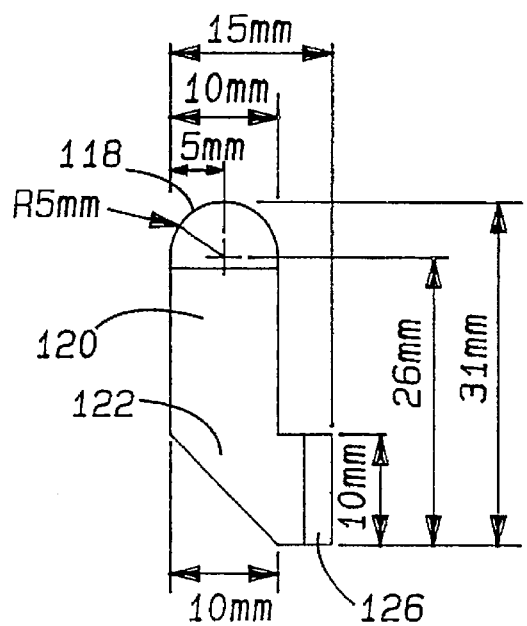
FIG. 7(b) shows a side view of the receiver lens body of FIG. 7(a)
Figure 7C:
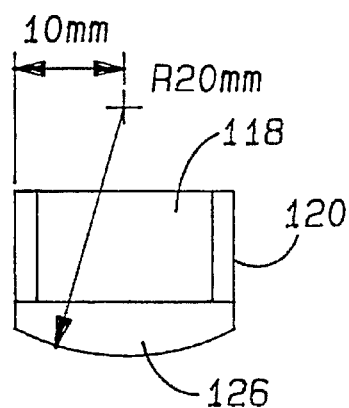
FIG. 7(c) shows a top view of the receiver lens body of FIG. 7(a)
Figure 7D:
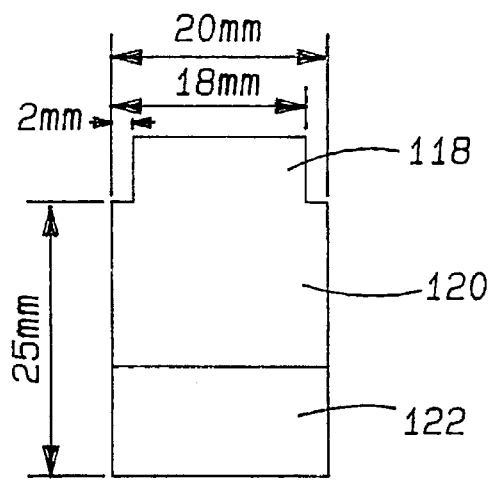
FIG. 7(d) shows a front view of the receiver lens body of FIG. 7(a)

FIG. 4 shows a vertical sectional view through the seed tube 24 around the sensor 38 at a sensing area 60. FIG. 5 shows a horizontal sectional view through the seed tube 24 along line 5—5 of FIG. 4. The sensor 38 is separated into an emitter side 62 and a receiver side 64. The emitter side 62 includes an emitter body 66 and the receiver side 64 includes a receiver body 68. In one embodiment, the emitter body 66, the receiver body 68 and the seed tube 24 are made of a plastic material and are integrally molded together. In this embodiment, the seed tube 24 includes a first half 70 and a second half 72 that are separately molded integrally with a first and second half of each of the emitter body 66 and the receiver body 68, respectively, and then are ultrasonically welded together to form a weld seam 74 between all interfacing surface features of the first half 70 and the second half 72. The different components of the emitter side 62 and the receiver side 64 that will be discussed below are placed between the first and second halves 70 and 72 of the seed tube 24 before the halves 70 and 72 are welded together. Reinforcement ribs 76 and 78 are formed in side panels 80 and 82, respectively, of the seed tube 24 for reinforcement purposes.

The optical fiber 42 is connected to the emitter body 66 by an emitter connector 86. The emitter connector 86 is locked into the emitter body 66. The optical fiber 42 includes an appropriate emitter fiber tip 88 that is suitable for the purposes described herein. Different methods are known in the art for terminating plastic optical fibers of the type described herein. In one embodiment, a hot-plate method, known to those skilled in the art, was selected as one suitable choice for terminating the fiber 42. The hot-plate technique melts and forms a polished face at the tip 88 to have an optical smooth surface finish perpendicular to the optical axis of the fiber 42. Connectors suitable for the emitter connector 86 are commercially available from different sources such as AMP Incorporated, Harrisburg, Pa., and Delphi Packard Electric. A discussion of these types of connectors can be found in several publications including the following papers: Cirillo, J. R. et al., "A Plastic Optical Fiber Termination System Designed for Automotive Manufacturing, Assembly and Service Environments," SAE Paper No. 920618, pp. 1–6; Van Woesik, Egbert T. C. M. et al., "New Design of N * N Coupler and Connectors for Plastic Optical Fibers," SAE Paper 940801, pp. 261–266; and Schreiter, Gerd et al., "New Types of Connectors for Plastic Optical Fibers for Vehicle Network Applications," SAE Paper 940799, pp. 247–251.

The emitter fiber tip 88 is positioned within the connector 86 such that the tip 88 is adjacent to an aperture 90. An emitter lens body 92 is positioned within the emitter body 66 adjacent to the aperture 90 and opposite to the fiber tip 88. FIGS. 6(a)–6(d) show a number of views of the emitter lens body 92. In one embodiment, the emitter lens body 92 is made up of a plurality of optical elements that are part of a single piece injection molded plastic structure. However, as will be appreciated by those skilled in the art, the lens body 92 can be made of separated optical structures that are cemented together by a suitable optical adhesive. Particularly, the lens body 92 includes an upper cylindrical lens 94 adjacent to the aperture 90. The lens 94 is positioned on a vertical body portion 96 that includes a narrow vertical body portion 96 and a wide vertical body portion 98 that forms a shoulder 100 therebetween. A horizontal face of a 45° prism 102 is positioned adjacent to the wide body portion 98 opposite to the lens 94. The 45° prism 102 provides an optical component for folding a radiation beam as will be discussed in greater detail below. A horizontal body portion 104 is positioned adjacent to a vertical face of the prism 102 and a lower cylindrical lens 106. In one embodiment, the emitter lens body 92 has the dimensions depicted in these figures. However, as will be appreciated by those skilled in the art, these dimensions can vary significantly without departing from the scope of the invention. An emitter lens window 108 is positioned adjacent to the lower lens 106 and the sensing area 60 so as to protect the lens body 92 from dirt and other accumulation that may enter the seed tube 24.

The optical fiber 44 is connected to the receiver body 68 by a receiver connector 112. The connector 112 is of the same type as the connector 86 above. The connector 112 is locked to the receiver body 68. The optical fiber 44 is positioned within the connector 112 such that a receiver tip 114 is formed at the end of the connector 112. A receiver lens body 116 is positioned within the receiver body 68 adjacent to the receiver tip 114, as shown. FIGS. 7(a)-7(d) show various views of the receiver lens body 116. The receiver lens body 116 is also formed of a plurality of optical elements that are part of a single piece injection molded plastic structure. Particularly, an upper cylindrical lens 118 is positioned on a vertical lens body portion 120 as shown. A horizontal face of a 45° prism 122 is positioned adjacent to the vertical lens body portion 120 opposite to the upper cylindrical lens 118. The 45° prism 122 provides a reflective surface for folding a radiation beam as will be discussed in greater detail below. A horizontal lens body portion 124 is positioned adjacent to a vertical face of the prism 122. A lower cylindrical lens 126 is positioned adjacent to the horizontal lens body portion 124 opposite to the prism 122, as shown. In one embodiment, the receiver lens body 116 includes the dimensions as shown by way of a non-limiting example. As will be appreciated by those skilled in the art, these dimensions can significantly vary from this embodiment without departing from the scope of the invention. A receiver lens window 128 is positioned within the seed tube 24 adjacent to the lower cylindrical lens 126 and the sensing area 60 so as to prevent dirt and other accumulation from entering the receiver body 68.

Figure 8:
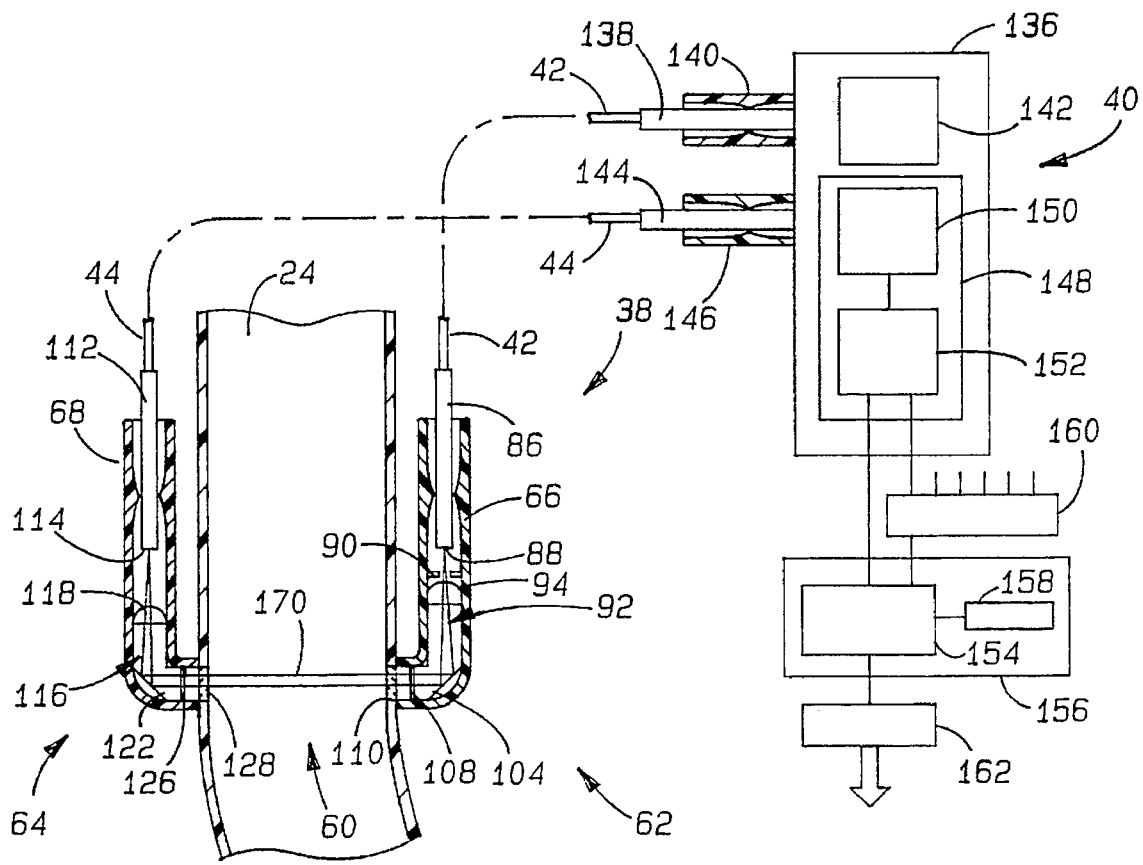
FIG. 8 shows the vertical sectional view of the seed tube as shown in FIG. 3 connected to a block diagram depiction of the sensing module that electrically monitors and counts the seeds.

FIG. 8 shows a diagram of a section of the system 36 where the sensor 38 is connected to the SPU 40 by the fiber-optic cables 42 and 44. This section of the SPU 40 shows a single sensor channel 136 of the system 36. The optical cable 42 includes an optical tip portion 138 that is secured to the sensor channel 136 by an optical fiber connector 140 relative to a radiation source 142. The radiation source 142 can be any applicable light emitting diode (LED) or laser diode suitable for the purposes described herein. The optical fiber 44 includes an optical tip portion 144 that is secured to the sensor channel 136 by an optical fiber connector 146 relative to a radiation detector 148. The radiation detector 142 includes a photodiode array 150 and a voltage/frequency converter 152. The associated connectors 140 and 146, radiation source, and detector 148 can be light-link emitters available from Siemens Corporation or the TSL230 available from Texas Instruments. The detector 148 can also be an analog type detector within the scope of the invention.

The signal output from the converter 152 of each channel is applied directly to a signal processing unit 154 of a microcontroller system 156 including a memory 158. A control line (for signal gain and sensitivity) from the converter 152 is applied to a multiplexer 160 that multiplexes all the control lines from all the different channels. An output from the multiplexer 160 is applied to the signal processing unit 154. A signal from the signal processing unit 154 is applied to the converter 152 so as to adjust the sensitivity of the detector 148 to allow for compensation for varying base line levels of radiation intensity. An output of the signal processing unit 154 is applied to a serial communication link 162 that is in connection with the monitor 46. The sensor channel 136, the microcontroller system 156, the multiplexer 160 and the link 162 would be included as part of the SPU 40 above.

Figure 10:
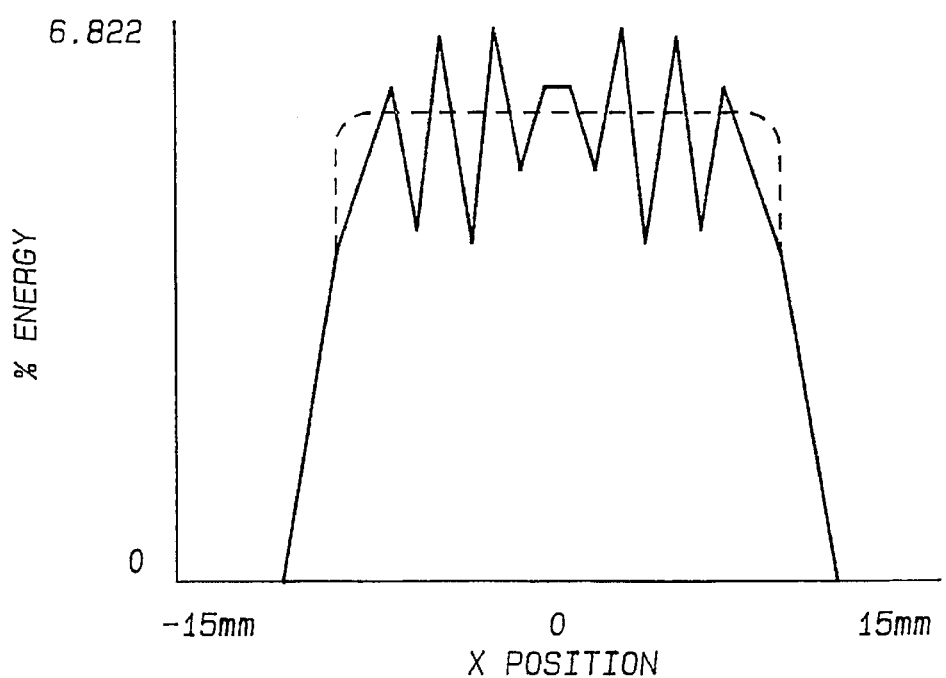
FIG. 10 shows an optical intensity graph of the optical beam of FIG. 9(a) at a region between the emitter lens body and the receiver lens body.
Figure 9A:
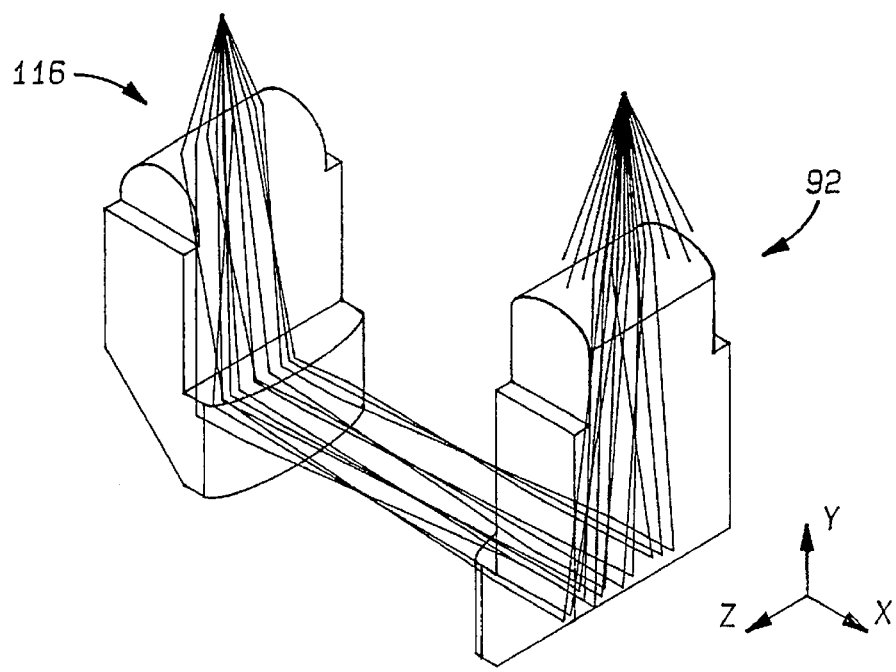
FIG. 9(a) shows a perspective view relative to an XYZ coordinate system of the rays of a radiation beam as the radiation beam propagates through an emitter lens body and a receiver lens body of the seed monitor system of the invention.
Figure 9B:
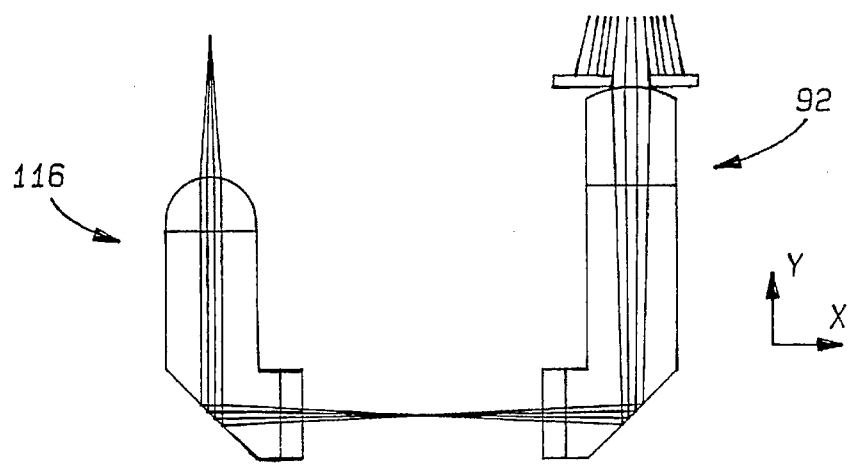
FIG. 9(b) shows a side view in the XY plane of the ray diagram of FIG. 9(a)
Figure 9C:
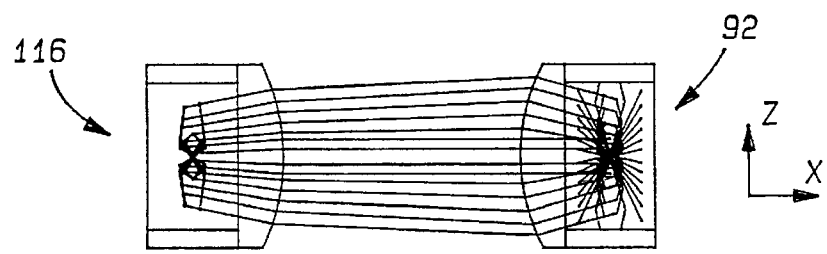
FIG. 9(c) shows a top view in the XZ plane of the ray diagram of FIG. 9(a)
Figure 9D:
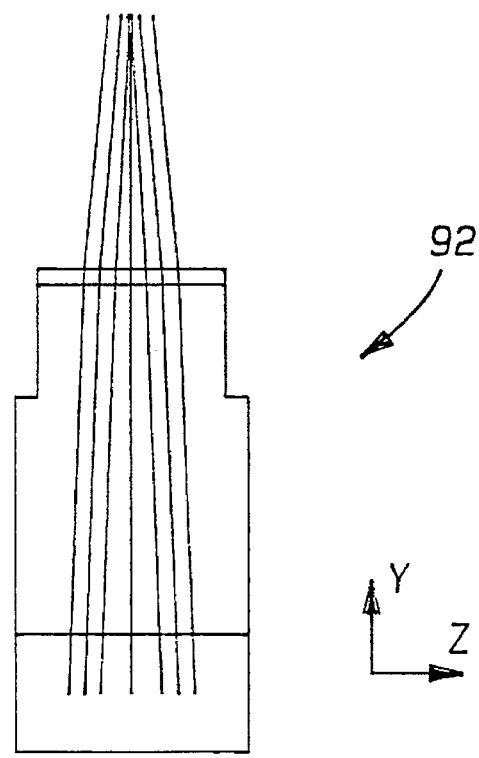
FIG. 9(d) shows a front view in the YZ plane of the emitter lens body of the ray diagram of FIG. 9(a)
Figure 9E:
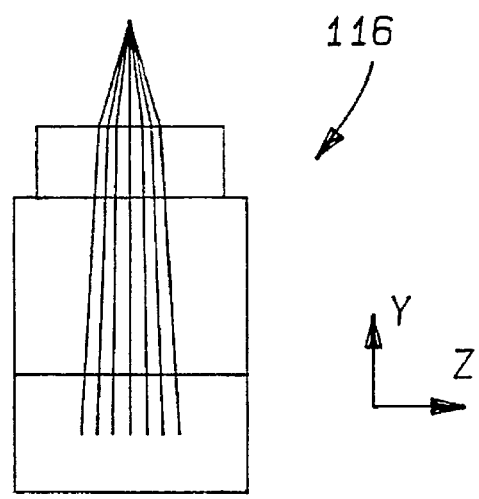
FIG. 9(e) shows a front view in the YZ plane of the receiver lens body of the ray diagram of FIG. 9(a)

A radiation beam 170 generated by the radiation source 142 is coupled into the cable 42 at the tip portion 138. In one embodiment, the radiation source 142 generates a radiation beam having a peak wavelength in the visible, infrared or near infrared region of the spectrum. Particularly, acceptable wavelengths can be 660 nm, 840 nm or between 910–940 nm. The radiation beam 170 travels through the cable 42 and is emitted from the tip 88 as a spatially non-uniform beam. FIGS. 9(a)-9(e) show various views of the rays of the radiation beam 170 with respect to an XYZ coordinate system as it travels through the emitter lens body 92 and the receiver lens body 116. The beam 170 is first shaped by the aperture 94 to provide a beam having a more uniform spatial intensity. The radiation beam 170 then enters the emitter lens body 92 through the upper cylindrical lens 94. The lens 94 substantially collimates the radiation beam 170 in the XY plane. The radiation beam 170 continues to spread non-uniformly in the YZ plane, and is then reflected 90° by the prism 102. After being reflected by the prism 102, the radiation beam 170 continues to spread until it is refracted by the lower cylindrical lens 106. The beam 170 is then comprised optimally of parallel rays that propagate across the sensing area 60 in the tube 24 to be received by the receiver lens body 116. FIG. 10 shows a graph of the energy distribution of the beam 170 in the sensing area 60. Position in the X direction is shown on the horizontal axis and percent of energy is shown on the vertical axis. The solid line of the graph of FIG. 10 results from a coarse distribution analysis using a relatively small number of discrete light rays in a light source model. In practice, the dash line represents the real energy distribution across the X-direction, assuming that an infinite number of light rays is being emitted.

The radiation beam 170 is focused by the receiver lower cylindrical lens 126 and is reflected 90° off of the prism 122. The beam 170 then impinges the upper cylindrical lens 118 and is focused and coupled into the tip 114 of the optical cable 44. The radiation beam 170 travels through the optical fiber 44 until it reaches the radiation detector 148. The radiation detector 148 has a variable radiation intensity sensitivity that allows for fluctuation in the nominal radiation intensity as defined by the intensity when no object is passing through the radiation beam 170 in the sensing area 60. The voltage/frequency converter 152 receives a voltage representation of the optical intensity of the radiation beam 170 from the photodiode array 150. The voltage/frequency converter 152 generates a square wave pulse signal where the period of the square wave is representative of the intensity of the radiation beam 170 at the photodiode array 150. The square wave pulse signal is applied to the signal processing unit 154 as a square wave input. The signal processing unit 154 measures the period of the square wave pulse signal by measuring the distance between the rising edge of each pulse. In this way, the signal processing unit 154 gives an indication of the optical intensity of the radiation beam 170 after it traverses the sensing area 60. The larger the period of the square wave pulsed signal, the lower the optical intensity of the beam 170.

Figure 12A:
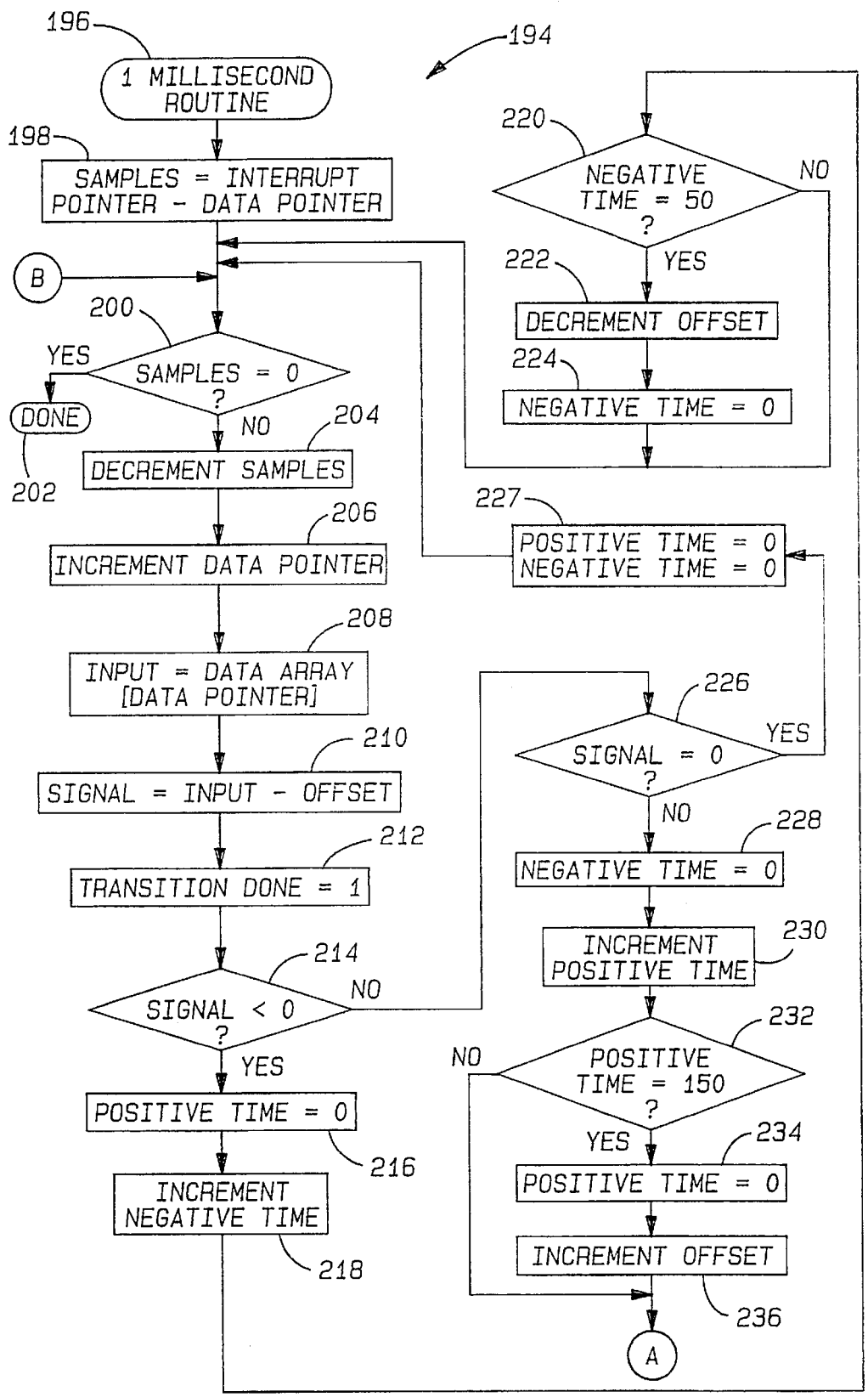
FIGS. 12(A–B) is a flow chart diagram of the overall operation of a signal processing unit of the seed monitoring system according to the invention.
Figure 12B:
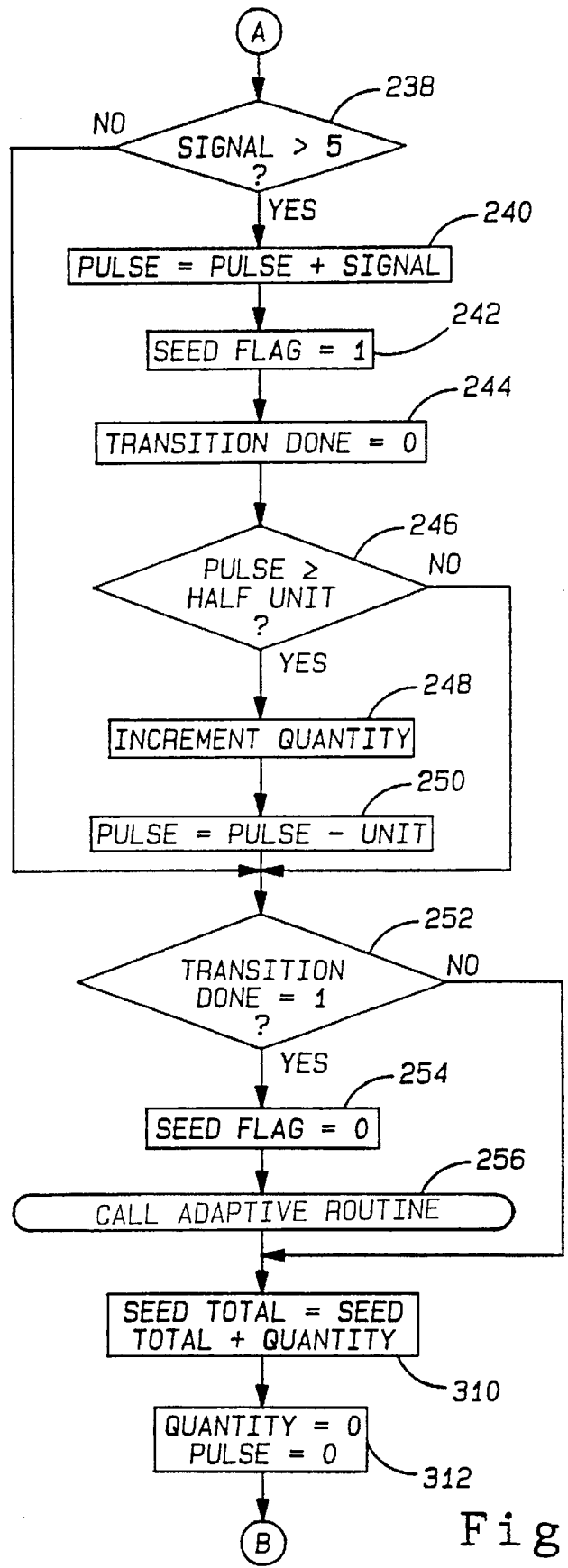
Figure 13B:
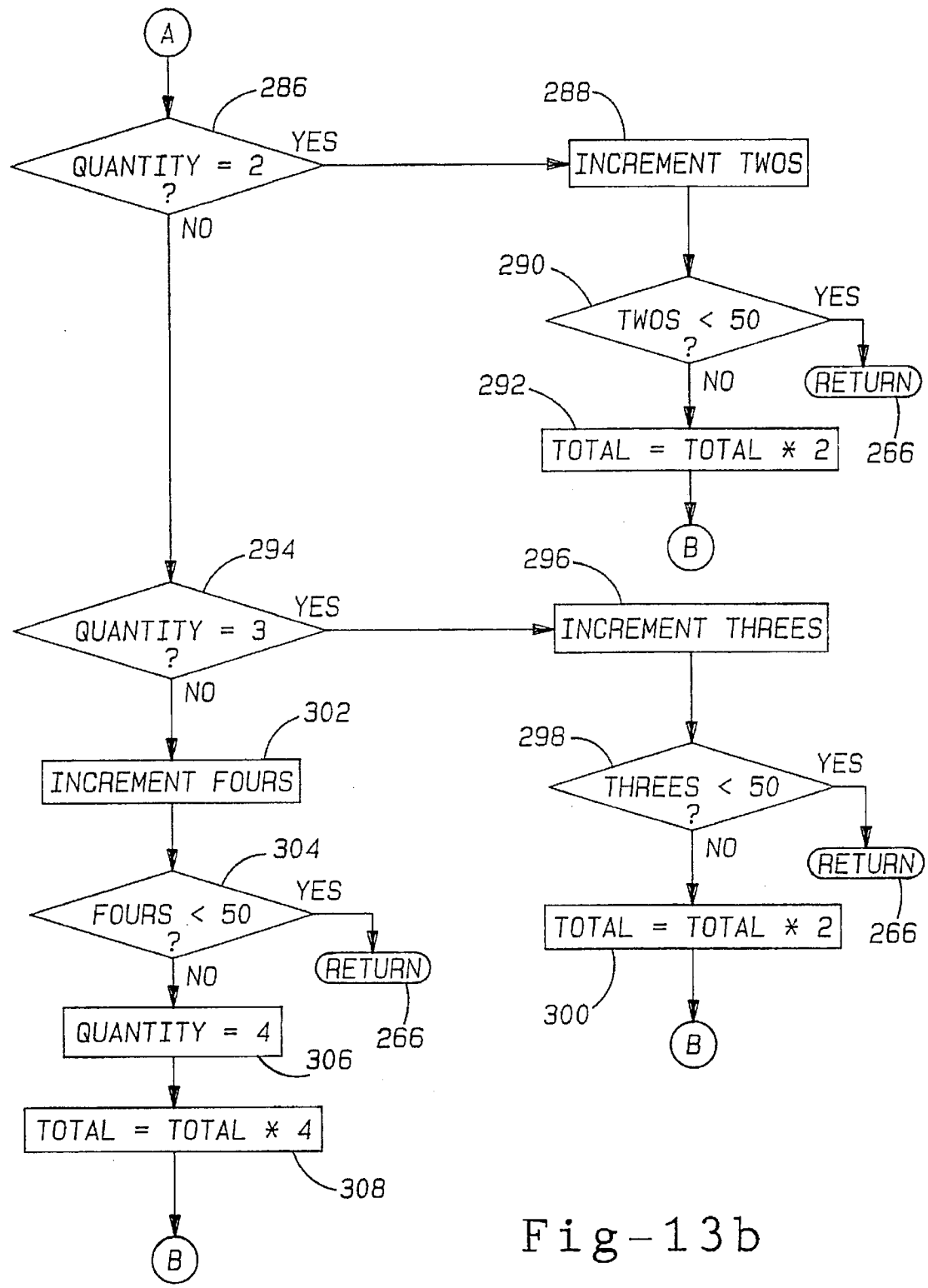
FIGS. 13(A–B) is a flow chart diagram of an adapting algorithm of the seed monitor system according to the invention.

FIGS. 11–13 show functional block diagrams depicting the manner in which the signal processing unit 154 processes the information received from the detector 148. The description below of this process describes one implementation of the system 36 to detect the presence or absence of particles within the seed tube 24. However, as will be appreciated by those skilled in the art, this process can be readily modified to sense the size of a particle given its velocity, or the velocity of the particle given its size. Also, the process can be further modified so that the frequency of, and the time between, subsequent particles passing the sensing area 40 can be determined.

An overview of the process performed by the signal processing unit 154 for counting the seeds 18 as they pass through the radiation beam 170 in the sensing area 60 will be given first. As mentioned above, light intensity of the radiation beam 170 is converted to a square wave pulse signal by the detector 148. The period of the pulse signal is inversely proportional to light intensity. The period of the square wave pulse signal is measured by an input capture peripheral within the signal processing unit 154. Data sampling is therefore done asynchronously, depending entirely on the frequency of the square wave pulse signal. The signal processing unit 154 can control the sensitivity of the detector 148, and can appropriately scale the frequency of the square wave pulse signal. For example, the sensitivity of the detector 148 can be increased such that sufficient information is gathered for each particle transition through the sensing area 60, and decreased so that the data samples are non-redundant. In one embodiment, the signal processing unit 154 adjusts the frequency of the pulsed signal between 4 kHz and 20 kHz. However, the signal processing unit 154 can adjust the frequency of the pulse signal to different ranges depending on specific applications. Because the input capture peripheral is interrupt driven, i.e., asynchronous, data collection is separated from the signal evaluation. The signal processing is done synchronously, for example once per millisecond, to evaluate the data samples accumulated in that time frame.

The software within the signal processing unit 154 begins by establishing a base line period measurement. This base line period, referred to as an offset variable, is the period of the square wave pulse signal corresponding to no particles or seeds 18 passing through the radiation beam 170 at the sensing area 60. Deviations from the offset variable indicate obstructions in the radiation plane that lower the light intensity of the radiation beam 170. As the light intensity is diminished by the particles or seeds 18 traversing the radiation beam 170 in the sensing areas 60, the deviation of the period measurements from the offset variable is accumulated as a pulse variable. The pulse variable is then compared to a unit variable representing an average value associated with one particle or seed 18 traversing the radiation beam 170 for a particular seed shape and size.

If the pulse variable reaches half of the unit variable, the signal processing unit 154 counts a particle. The value of the unit variable is then subtracted from the pulse variable, making the pulse variable negative. If only one particle is traversing the radiation beam 170, further accumulation of the deviations from the offset variable will bring the pulse variable back near zero. If multiple particles are passing through the radiation beam 170, the pulse variable will continue to increase until another particle is counted and the unit variable again will be subtracted from the pulse variable. This process continues until the value of a signal variable returns to the value of the offset variable. The samples variable is a loop counter calculated once per time period as the difference between an interrupt pointer and a data pointer. The interrupt pointer is an index into a data array buffer that is advanced by each new data sample. The data array buffer is a circular buffer that contains the raw data period measurements. The data array is a circular buffer in that the address locations of data array wrap around such that after the last register location is filled, the next register location to be filled is the first register location. The data array buffer can be included in the on-board random access memory of the signal processing unit 154. The data pointer is an index into the data array buffer that points to the sample being currently evaluated. Filtering is done on the offset variable and the unit variable to adapt to different levels of light intensities and different particle sizes, respectively.

FIG. 11 shows a flow chart diagram 180 of a data collection routine setting out the process by which the microcontroller system 156 fills the data array buffer with samples. The data collection routine is interrupt driven in that the time of each period of the square wave pulse signal is recorded. In the step of box 184, a new time stamp variable is defined as an input capture function. The length of the period is then determined by subtracting a previous time stamp variable from the new time stamp variable. The period is saved in the data array buffer at the step of box 186. The new time stamp variable is then saved as an old time stamp variable in the step of box 188. The interrupt pointer that establishes the address location where the next data sample is to be stored in the data array is incremented in the step of box 190. The periods of the square wave pulse signal are continually stored in the data array in this manner. In one embodiment, the data array buffer includes 256 sample locations that store the last 256 consecutive periods of the pulse signal for data analysis.

FIG. 12 shows a flow chart diagram 194 depicting the data analysis operation of the data stored in the data array buffer. In one embodiment, the data analysis sequence is performed in one millisecond as a one millisecond routine 196. Of course, other time intervals may be equally applicable for different applications. The process of the flow chart diagram 194 begins by initializing all the variables that are defined for the process. The number of samples stored in the data array buffer is determined by subtracting the data pointer from the interrupt pointer, and storing the result as the variable samples as depicted in the step of box 198. The system 156 then begins a loop to evaluate the new data until no samples remain. The loop starts at the step of decision diamond 200 where the system 156 determines if the samples variable equals zero. If the samples variable does equal zero, then the process is finished at the step of box 202.

If the samples variable does net equal zero, then the system 156 decrements the samples variable at the step of box 204. The data pointer is incremented at the step of box 206. Then, the system 156 defines an input variable that receives the value in the data array buffer at the index location of the data pointer at the step of box 208. At the step of box 210, the signal variable is determined as the difference between the input variable and the offset variable. The offset variable is the base line value of the data in the data array buffer, i.e., the period measurement when no seed is traversing the sensing area 60. Next, the system 156 sets a transition done variable equal to one at the step of box 212. The transition done variable is a boolean variable set at the start of the process for each sample, and is cleared if it is later learned that a particle is still in transition in the radiation beam 170.

The offset variable is filtered by evaluating the signal variable by first determining if the signal variable is less than zero at the step of box 214. If the signal variable is less than zero, then the process defines a positive time variable as zero at the step of box 216. The positive time variable is the number of consecutive period measurements that are greater than the offset variable. Next, a negative time variable is incremented by one at the step of box 218. The process then determines if the negative time variable is equal to fifty at the step of decision diamond 220. The negative time variable is the number of consecutive period measurements that are less than the offset variable. The value fifty is used in this specific embodiment as an example, and as such can be any appropriate value for other specific applications within the scope of the invention. If the negative time variable does not equal fifty, then the system 156 returns to the step of box 200 to determine if the samples variable equals zero. If, however, the negative time variable does equal fifty, then the system 156 decrements the offset variable at the step of box 222, sets the negative time variable to zero at the step of box 224, and then returns to the step of determining if the samples variable equals zero at the step of box 200.

If the signal variable is not less than zero at the step of decision diamond 214, then the system 156 determines if the signal variable equals zero at the step of decision diamond 226. If the signal variable does not equal zero, then the system 156 sets the negative time variable to zero at the step of box 228, and increments the positive time variable at the step of box 230. The system 156 then determines if the positive time variable is equal to one hundred and fifty at the decision diamond 232. The value of one hundred and fifty is used by way of a non-limiting example in that other values for the positive time variable can be equally applicable for different applications within the scope of the present invention. If the positive time variable does equal one hundred and fifty, then the system 156 sets the positive time variable equal to zero at the step of 234, and increments the offset variable at the step of 236. In this manner, if the negative time variable reaches fifty, then the offset variable is decremented, and if the positive time variable reaches one hundred fifty, then the offset variable is incremented. If the signal variable is zero at the step of decision diamond 226, then the positive and negative time variables are both reset to zero and the process returns to the step of diamond 20.

If the positive time variable does not equal one hundred and fifty at the step of decision diamond 232, or the system 156 increments the offset variable at the step of box 236, the system 156 then determines if the signal variable is greater than a threshold value at the step of decision diamond 238. In this example, the threshold value is set to be five, however, this threshold value is used as a non-limiting example in that other threshold values for different applications would be equally applicable without departing from the scope of the invention. If the signal variable is greater than the threshold value, then the system 156 adds the signal variable to an integration variable pulse at the step of box 240. The integration variable pulse is the accumulation of all of the signal variables that are greater than the threshold. The system 156 then sets a seed flag to one and the transition done flag to zero at the steps of boxes 242 and 244, respectively. The seed flag is a boolean variable that is set each time a signal is found to be greater than five (the value of five being used by way of a non-limiting example), and is cleared when it is later found that the seed transition through the radiation beam 170 is finished.

The pulse signal is then evaluated to count the number of particles traversing the sensing area 60. Each time the pulse variable exceeds half of the unit variable at the step of decision diamond 246, another particle is detected and a quantity variable is incremented at the step of box 248. The unit variable is then subtracted from the pulse variable at the step of box 250. The unit variable is a value representing the average size of a pulse created by a particle passing through the sensing area 60. Next, the system 156 determines if the transition done variable is equal to one at the decision diamond 252. If the transition done variable is equal to one, then the system 156 sets the seed flag to zero at the step of 254.

The unit variable is then filtered by adaptive subroutine 256. FIG. 13 shows a flow chart diagram 258 of the adaptive subroutine 256. The filtering process first determines if a quantity variable is equal to zero at the step of decision diamond 260. The quantity variable is the number of particles or seeds 18 counted in the current pulse variable.

If the quantity variable is equal to zero, then the system 156 will increment a zeros register at the step of box 262. The zeros register stores the number of particles which pass through the radiation beam 170, but did not accumulate a large enough value in the pulse variable to be considered a whole particle to be counted. Likewise, a ones register stores the number of particles counted as one discrete particle, a twos register stores the number of particle clusters passing through the radiation beam 170 that are counted as two particles, a threes register stores the number of particle clusters that pass through the radiation beam that are counted as three particles, and a fours register stores the number of particle clusters passing through the radiation beam 170 that are counted as four or more particles. Of course, the system 156 can be tailored to include other registers that store the number of particles passing through the radiation beam as more than four particles, or can be tailored to reduce the number of registers to one, two or three. The system 156 will then determine if the zeros register is less than fifty. If the zeros register is less than fifty, then the system 156 returns to the main routine at the step of box 266. If, however, the zeros register is not less than fifty, then a total variable is set to the previous total variable divided by two at the step of box 268. The total variable is a filter variable that includes the unit variable and a fractional value. The system 156 will then set all of the zeros-fours registers to zero at the step of box 270.

If the quantity variable does not equal zero at the decision diamond 260, then the system 156 determines if the quantity variable equals one at decision diamond 276. If the quantity variable does equal one, then the system 156 sets a new total variable equal to the past total variable plus the pulse variable at box 278. The system then increments the ones register at the step of box 280. The system 156 then determines if the ones register is less than fifty at decision diamond 282. If the ones register is not less than fifty, then the system 156 sets the ones register, the zeros register, the twos register, the threes register, and the fours register to zero at the step of box 270.

After these registers are set to zero, or the ones register is less than fifty, the process sets the unit variable equal to the total variable at the step of box 272. The process will then set the half unit variable equal to the unit variable divided by two at the step of box 274, and will then return to the main process at the step of box 266.

If the quantity variable does not equal one at the step of decision diamond 276, then the system 156 determines if the quantity variable is equal to two at decision diamond 286. If the quantity variable is equal to two, then the system 156 increments the twos register at the step of box 288. The system 156 then determines if the twos register is less than fifty at the decision diamond 290. If the twos register is less than fifty, then the system 156 returns to the process at the step of box 266. If, however, the twos register is not less than fifty, then the system 156 sets the total variable equal to the previous total variable times two at the step of box 292. The system 156 then returns to the box of setting the zeros through fours registers equal to zero at the step of box 270.

If the system 156 determines that the quantity variable does not equal two at the step of decision diamond 286, the system 156 will determine if the quantity variable equals three at the step of decision diamond 294. If the quantity variable does equal three at the decision diamond 294, then the system 156 will increment the threes register at the step of box 296. The system 156 will determine if the threes register is less than fifty at the decision diamond 298. If the threes register is less than fifty, then the system 156 returns to the process of the main algorithm at the step of box 266. If, however, the threes register is not less than fifty, then the system 156 multiplies the current total variable by two to get a new total variable at the step of box 300. The system 156 then returns to the step of setting the zeros through fours registers to zero at the step of box 270.

If the system 156 determines that the quantity variable does not equal three at the decision diamond 294, the system 156 increments the fours register at the step of box 302. The system 156 then determines if the fours register is less than fifty at the decision diamond 304. If the fours register is less than fifty, then the system 156 returns to the main process at the box 266. If, however, the fours register is not less than fifty, the system 156 will set the quantity variable equal to four and determine a new total variable as the previous past total variable times four at the step of box 308. The system 156 will then return to the step of setting the zeros through fours registers to zero at the step of box 270.

After the filtering process of the total adjustment routine at box 256 or the transition done flag does not equal zero at the decision diamond 256, the system 156 will set a new seed total variable as the previous seed total variable plus the quantity variable at the step of box 310. The system 156 will then set the quantity variable and the pulse variable equal to zero at the step of box 312. The system 156 will then return to the loop to determine if the samples variable is equal to zero at the decision diamond 200.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A particle monitoring system for counting a plurality of particles as they pass through a sensing area, said system comprising:

optical beam generating means for generating an optical beam;

first optical beam shaping means for shaping the optical beam, said first shaping means being responsive to the optical beam from the beam generating means and shaping the optical beam to produce an optical beam having a substantially uniform spatial intensity and being substantially collimated, said first shaping means directing the shaped optical beam of radiation through the sensing area;

optical beam detecting means for detecting the optical beam after it has passed through the sensing area, said detecting means providing a signal indicative of the intensity of the optical beam; and monitoring means for monitoring the signal indicative of the optical beam intensity from the detecting means, said monitoring means generating a signal indicative of the number of particles that interfere with the optical beam in the sensing area in relation to changes in the optical bean intensity so as to provide a count of the particles passing through the sensing area.

2. The system according to claim 1 wherein the optical beam is directed from the beam generating means to the first beam shaping means by an optical fiber.

3. The system according to claim 1 wherein the first beam shaping means includes an emitter lens body, said emitter lens body including a first cylindrical lens that collimates the optical beam in a first direction and a second cylindrical lens that collimates the optical beam in a second direction.

4. The system according to claim 3 wherein the emitter lens body includes a 45° prism positioned between the first cylindrical lens and the second cylindrical lens, said prism providing folding optics that reflects the optical beam substantially 90°.

5. The system according to claim 1 wherein the first beam shaping means includes an aperture and at least one lens, said aperture being responsive to the optical beam from the beam generating means, said aperture causing the optical beam to be more spatially uniform, said at least one lens being responsive to the optical beam from the aperture and causing the optical beam to be more spatially uniform.

6. The system according to claim 1 further comprising a second optical beam shaping means for shaping the optical beam after it has passed through the sensing area, said second beam shaping means focusing the optical beam to the detecting means.

7. The system according to claim 6 wherein the second optical beam shaping means focuses the optical beam of radiation onto a optical fiber so as to transmit the optical beam to the detecting means.

8. The system according to claim 6 wherein the second shaping means includes a receiver lens body, said receiver lens body including a first cylindrical lens that is responsive to the optical beam from the sensing area and focuses the optical beam in a first direction and a second cylindrical lens that is responsive to the optical beam from the first cylindrical lens and focuses the optical beam in a second direction.

9. The system according to claim 8 wherein the receiver lens body includes a 45° prism positioned between the first and second cylindrical lenses, said 45° prism providing folding optics that reflects the optical beam substantially 90°.

10. The system according to claim 1 wherein the detecting means includes a photosensitive device and a voltage-to-frequency converter, said photosensitive device providing an electrical signal indicative of the optical beam intensity and said voltage-to-frequency converter converting the electrical a signal to a pulse train signal.

11. The system according to claim 10 wherein the monitoring means is responsive to the pulse train signal so as to determine the intensity of the optical beam at the detector means, said monitoring means determining the period of the pulses in the pulse train signal to determine the optical beam intensity.

12. The system according to claim 1 wherein the particle monitor is a seed monitor that counts seeds being dropped through a seed tube, wherein the sensing area is within the seed tube, said first optical beam shaping means being secured to the seed tube and directing the beam of optical radiation across the seed tube.

13. The system according to claim 12 wherein the beam generating means and the beam detecting means are positioned remotely from the seed tube, and wherein a first optical fiber transmits the optical beam from the beam generating means to the first optical beam shaping means and a second optical fiber transmits the optical beam from the sensing area to the beam detecting means.

14. The system according to claim 12 wherein the seed tube is one of a plurality of seed tubes in connection with a seed planter, and wherein each seed tube includes a separate beam generating means, beam detecting means and first optical beam shaping means, each of the beam generating means and beam detecting means being housed within a single enclosure remotely from the seed tubes.

15. The system according to claim 1 wherein the monitoring means includes a processing system, said processing system including means for providing an indication of the number of particles where the particles vary in size and shape.

16. The system according to claim 1 wherein the monitoring means includes means for adjusting the sensitivity of the monitoring means to compensate for varying base line levels of the intensity of the optical beam.

17. The system according to claim 1 wherein the monitoring means includes a processing system, said processing system including means for detecting a plurality of particles that pass through the sensing area at least partially at the same time.

18. A fiber-optic sensing system for use in connection with a seed planter, said seed planter including a plurality of seed tubes that simultaneously dispense seeds from the seed planter into a plurality of planting rows where each seed tube includes a sensing area within the tube, said system comprising:

an optical beam generating device that generates an optical beam;

a first optical fiber having a first end and a second end, said first end of said first optical fiber being responsive to the optical beam from the optical beam generating device;

an optical beam emitting device positioned on each seed tube, said emitting device including an emitter lens body and an emitter connector, said emitter lens body including at least one lens, wherein the second end of the first optical fiber is connected to the emitter connector within the emitter device;

an optical beam receiving device positioned on the seed tube opposite to the emitting device, said receiving device including a receiver lens body and a receiver connector, said receiver lens body including at least one lens, said at least one lens of the receiving device being responsive to the optical beam from the sensing area;

a second optical fiber including a first end and a second end, wherein the first end of the second optical fiber is connected to the receiver connector within the receiving device; and a detecting device being responsive to the optical beam from the beam generating device, said second end of said second optical fiber being positioned relative to the detecting device so as to direct the optical beam into the detecting device, wherein the detecting device and the beam generating device are positioned at a location remote from the seed tubes such that electronic circuitry of the sensing system is not positioned on the seed tubes.

19. The system according to claim 18 wherein the emitting device further includes an aperture positioned between the emitter connector and the emitter lens body, said aperture being responsive to the optical beam from the generating device and focusing the optical beam onto the emitter lens body.

20. The system according to claim 18 wherein the emitter lens body includes a first cylindrical lens, a 45° prism and a second cylindrical lens, said first cylindrical lens being responsive to the optical beam from the emitter connector, said prism being responsive to the optical beam from the first cylindrical lens and reflecting the optical beam substantially 90°, and said second cylindrical lens being responsive to the optical beam from the prism so as to direct the optical beam through the sensing area.

21. The system according to claim 18 wherein the receiver lens body further includes a first cylindrical lens, a 45° prism and a second cylindrical lens, said first cylindrical lens being responsive to the optical beam from the sensing area, said 45° prism being responsive to the optical beam from the first cylindrical lens and reflecting it substantially 90°, and said second cylindrical lens being responsive to the optical beam from the prism so as to direct the optical beam into the first end of the second optical fiber.

22. The system according to claim 18 wherein the emitter lens body includes a plurality of lenses that shape the optical beam so that the optical beam is collimated and has a substantially uniform spatial intensity within the sensing area.

23. The system according to claim 18 further comprising a control device, said control device being responsive to a signal indicative of the light intensity of the optical beam from the detecting device, said signal from the detecting device of the optical beam intensity being a square wave pulse signal.

24. The system according to claim 23 wherein the control device is operable to distinguish a plurality of seeds that pass through the sensing area at least partially at the same time, provide an indication of the number of seeds where the seeds may vary in size and shape, compensate for varying base line levels of optical beam intensity.

25. A seed tube for use in connection with a seed planter, said seed tube comprising a seed sensor that counts seeds as they are dispensed through the seed tube, said seed sensor including an emitter lens body that emits an optical beam into a sensing area within the seed tube and a receiver lens body that is responsive to the optical beam after it is traverses the seed tube, said emitter lens body being a single piece body including a first emitter lens, a second emitter lens and an emitter reflector positioned therebetween, and the receiver lens body being a single piece body including a first receiver lens, a second receiver lens and a receiver reflector positioned therebetween, said seed tube being a plastic member formed from a first plastic half and a second plastic half that are secured to each other, wherein the emitter lens body and the receiver lens body are positioned within the seed tube.

26. The seed tube according to claim 25 wherein the first half and second half are ultrasonically welded together.

27. The seed tube according to claim 25 wherein the first emitter lens, the second emitter lens, the first receiver lens, and the second receiver lens are cylindrical lenses, and the emitter reflector and the receiver reflector are substantially 45° prisms.

28. An optical sensor for optically counting seeds as they are dispensed through a seed tube associated with a seed planter, said seed tube including an emitter device having a plurality of optical components, the emitter device optical components including a first cylindrical lens, a second cylindrical lens and a substantially 90° reflector positioned between the first and second lens, wherein the first cylindrical lens collimates an optical beam in a first direction and focuses the optical beam onto the reflector, and the reflector reflects the optical beam onto the second cylindrical lens, said second cylindrical lens collimates the optical beam in a second direction to be emitted from the emitter device.

29. The optical sensor according to claim 28 wherein the reflector component is a 45° prism.

30. The optical sensor according to claim 28 wherein the first and second cylindrical lenses focus the optical beam to have a substantially uniform spatial intensity within the sensing area.

31. An optical sensor for optically counting particles as the particles traverse a counting area, said optical sensor comprising:

beam generating means for generating a substantially collimated optical beam of spatially uniform intensity, said optical beam traversing the counting area; and a detector responsive to the optical beam after it has traversed the counting area, said detector generating a signal indicative of the intensity of the optical beam, said signal being a square wave pulse signal where the period between consecutive pulses in the pulse signal is inversely proportional to the intensity of the optical beam.

32. The optical sensor according to claim 31 wherein the detector includes a photosensitive array and a voltage-to-frequency converter, said photosensitive array being responsive to the optical beam so as to convert the optical beam to an electrical signal, said voltage-to-frequency converter being responsive to the electrical signal so as to generate the pulse signal for subsequent digital signal processing.

33. An optical sensor for optically counting particles as the particles traverse a counting area, said optical sensor comprising:

beam generating means for generating a substantially collimated optical beam of spatially uniform intensity, said optical beam traversing the counting area;

a detector responsive to the optical beam after it has traversed the counting area, said detector generating a square wave pulse signal indicative of the intensity of the optical beam; and processing means for processing the signal indicative of the optical beam intensity from the detector, said processing means including algorithm means for detecting and discriminating a plurality of particles that pass through the counting area at least partially at the same time, and providing a count of the particles passing through the counting area.

34. The sensor according to claim 33 wherein the algorithm means provides an indication of the number of particles where the particles vary in size and shape.

* * * * *